United States Patent
Goto et al.

(10) Patent No.: US 10,175,400 B2
(45) Date of Patent: Jan. 8, 2019

(54) POLARIZER, POLARIZING PLATE, AND IMAGE DISPLAY APPARATUS

(71) Applicant: NITTO DENKO CORPORATION, Ibaraki-shi, Osaka (JP)

(72) Inventors: Shusaku Goto, Ibaraki (JP); Akinori Izaki, Ibaraki (JP); Daisuke Ogomi, Ibaraki (JP)

(73) Assignee: NITTO DENKO CORPORATION, Osaka (JP)

( * ) Notice: Subject to any disclaimer, the term of this patent is extended or adjusted under 35 U.S.C. 154(b) by 0 days.

(21) Appl. No.: 15/271,891

(22) Filed: Sep. 21, 2016

(65) Prior Publication Data

US 2017/0090086 A1  Mar. 30, 2017

(30) Foreign Application Priority Data

Sep. 28, 2015 (JP) ................. 2015-190040

(51) Int. Cl.
*G02B 5/30* (2006.01)
*C08J 7/04* (2006.01)
(Continued)

(52) U.S. Cl.
CPC ............ *G02B 5/3033* (2013.01); *C08J 7/047* (2013.01); *C09D 129/04* (2013.01); *G02B 1/04* (2013.01); *G02F 1/133528* (2013.01); *H04N 5/23293* (2013.01); *C08J 2329/04* (2013.01); *C08L 2205/02* (2013.01); *G02F 2202/28* (2013.01)

(58) Field of Classification Search
USPC ....................................... 428/220
See application file for complete search history.

(56) References Cited

U.S. PATENT DOCUMENTS 2,409,923 A * 10/1946 Barnes ................ G03C 9/04
                                                    101/464
4,181,756 A    1/1980 Fergason
(Continued)

FOREIGN PATENT DOCUMENTS

CN    101569205 A    10/2009
CN    101925846 A    12/2010
(Continued)

OTHER PUBLICATIONS

Machine English Translation_JP_2014211548_A; Production Method of Polarizing Laminate Film Having Region Showing no Polarizance and Polarizing Plate; Nov. 13, 2014; JPO; whole document.*

(Continued)

*Primary Examiner* — Tahseen Khan
(74) *Attorney, Agent, or Firm* — Westerman, Hattori, Daniels & Adrian, LLP

(57) ABSTRACT

There is provided a polarizer that can realize multi-functionalization and high-functionalization of an electronic device, such as an image display apparatus. A polarizer according to an embodiment of the present invention includes a resin film containing iodine, wherein the polarizer has formed therein a transparent portion having a transmittance higher than that of another portion, and when the polarizer is placed under an environment having a temperature of 60° C. and a humidity of 90% for 2 hours, a transmittance change ($\Delta Ts$) of the transparent portion is 10% or less.

14 Claims, 1 Drawing Sheet

(51) Int. Cl.
   *C09D 129/04* (2006.01)
   *G02B 1/04* (2006.01)
   *G02F 1/1335* (2006.01)
   *H04N 5/232* (2006.01)

(56) References Cited

U.S. PATENT DOCUMENTS

| | | |
|---|---|---|
| 4,396,646 A | 8/1983 | Schuler et al. |
| 4,466,704 A | 8/1984 | Schuler et al. |
| 5,327,285 A | 7/1994 | Faris |
| 5,374,477 A | 12/1994 | Lawless et al. |
| 5,430,566 A * | 7/1995 | Sakaya ............ G02B 5/3083 349/118 |
| 5,593,771 A | 1/1997 | Lawless et al. |
| 5,926,310 A | 7/1999 | Tamura et al. |
| 6,072,566 A | 6/2000 | Fujii et al. |
| 6,188,451 B1 | 2/2001 | Fujii et al. |
| 6,258,429 B1 | 7/2001 | Nelson |
| 6,606,136 B2 | 8/2003 | Matsumoto et al. |
| 8,101,884 B2 | 1/2012 | Kato et al. |
| 8,130,293 B2 | 3/2012 | Kanamori et al. |
| 8,248,558 B2 | 8/2012 | Kimura et al. |
| 8,259,263 B2 | 9/2012 | Kimura et al. |
| 8,277,587 B2 | 10/2012 | Kimura et al. |
| 8,314,987 B2 | 11/2012 | Goto et al. |
| 8,320,042 B2 | 11/2012 | Goto et al. |
| 8,379,169 B2 | 2/2013 | Kitagawa et al. |
| 8,404,334 B2 | 3/2013 | Kimura et al. |
| 8,411,360 B2 | 4/2013 | Kitagawa et al. |
| 8,467,177 B2 | 6/2013 | Mathew et al. |
| 8,491,737 B2 | 7/2013 | Kimura et al. |
| 8,520,169 B2 | 8/2013 | Kitagawa et al. |
| 8,520,171 B2 | 8/2013 | Kitagawa et al. |
| 8,657,976 B2 | 2/2014 | Kimura et al. |
| 8,709,567 B2 | 4/2014 | Kitagawa et al. |
| 8,721,816 B2 | 5/2014 | Kitagawa et al. |
| 8,771,454 B2 | 7/2014 | Goto et al. |
| 8,852,374 B2 | 10/2014 | Goto et al. |
| 9,023,168 B2 | 5/2015 | Kitagawa et al. |
| 9,039,861 B2 | 5/2015 | Yasui et al. |
| 9,143,668 B2 | 9/2015 | Mathew et al. |
| 9,169,423 B2 | 10/2015 | Yasui et al. |
| 9,244,307 B2 | 1/2016 | Hada et al. |
| 9,283,740 B2 | 3/2016 | Kitagawa et al. |
| 9,291,744 B2 | 3/2016 | Sawada et al. |
| 9,329,307 B2 | 5/2016 | Sawada et al. |
| 9,372,505 B2 | 6/2016 | Mathew et al. |
| 9,381,534 B2 | 7/2016 | Kim et al. |
| 9,442,234 B2 | 9/2016 | Kitagawa et al. |
| 9,442,235 B2 | 9/2016 | Kitagawa et al. |
| 9,459,390 B2 | 10/2016 | Kitagawa et al. |
| 9,618,668 B2 | 4/2017 | Kitagawa et al. |
| 9,744,750 B2 | 8/2017 | Kitagawa et al. |
| 9,925,553 B2 | 3/2018 | Kim et al. |
| 10,009,525 B2 | 6/2018 | Mathew et al. |
| 2002/0071179 A1 | 6/2002 | Maeda et al. |
| 2004/0212555 A1 | 10/2004 | Falco |
| 2006/0222813 A1 | 10/2006 | Kato et al. |
| 2007/0224416 A1 | 9/2007 | Matsubayashi et al. |
| 2008/0192345 A1 | 8/2008 | Mochizuki et al. |
| 2009/0136712 A1 | 5/2009 | Sato |
| 2009/0278954 A1 | 11/2009 | Kanamori et al. |
| 2010/0032088 A1 | 2/2010 | Kato et al. |
| 2010/0283943 A1 | 11/2010 | Kimura et al. |
| 2010/0288420 A1 | 11/2010 | Kimura et al. |
| 2010/0316817 A1 | 12/2010 | Kimura et al. |
| 2012/0052197 A1 | 3/2012 | Sawada et al. |
| 2012/0055607 A1 | 3/2012 | Kitagawa et al. |
| 2012/0055608 A1 | 3/2012 | Kitagawa et al. |
| 2012/0055621 A1 | 3/2012 | Goto et al. |
| 2012/0055622 A1 | 3/2012 | Kitagawa et al. |
| 2012/0055623 A1 | 3/2012 | Kitagawa et al. |
| 2012/0056211 A1 | 3/2012 | Kitagawa et al. |
| 2012/0056340 A1 | 3/2012 | Kitagawa et al. |
| 2012/0057104 A1 | 3/2012 | Kitagawa et al. |
| 2012/0057107 A1 | 3/2012 | Kitagawa et al. |
| 2012/0057231 A1 | 3/2012 | Goto et al. |
| 2012/0057232 A1 | 3/2012 | Goto et al. |
| 2012/0058291 A1 | 3/2012 | Kitagawa et al. |
| 2012/0058321 A1 | 3/2012 | Goto et al. |
| 2012/0105400 A1 | 5/2012 | Mathew et al. |
| 2012/0106063 A1 | 5/2012 | Mathew et al. |
| 2012/0160420 A1 | 6/2012 | Kimura et al. |
| 2012/0180930 A1 | 7/2012 | Kimura et al. |
| 2012/0206641 A1 | 8/2012 | Baba |
| 2012/0211167 A1 | 8/2012 | Kimura et al. |
| 2012/0216937 A1 | 8/2012 | Kimura et al. |
| 2013/0017363 A1 | 1/2013 | Morioka et al. |
| 2013/0100529 A1 | 4/2013 | Kitagawa et al. |
| 2013/0114139 A1 | 5/2013 | Kitagawa et al. |
| 2013/0141787 A1 | 6/2013 | Kim et al. |
| 2013/0160938 A1 | 6/2013 | Yasui et al. |
| 2013/0216805 A1 | 8/2013 | Yasui et al. |
| 2013/0265708 A1 | 10/2013 | Mathew et al. |
| 2014/0016198 A1 | 1/2014 | Sawada et al. |
| 2014/0044947 A1 | 2/2014 | Sawada et al. |
| 2014/0118826 A1 | 5/2014 | Jiao et al. |
| 2014/0130955 A1 | 5/2014 | Yasui et al. |
| 2014/0186568 A1 | 7/2014 | Kitagawa et al. |
| 2014/0342129 A1 | 11/2014 | Kim et al. |
| 2014/0378020 A1 | 12/2014 | Hada et al. |
| 2015/0158046 A1 | 6/2015 | Kim et al. |
| 2015/0160390 A1 | 6/2015 | Goyal et al. |
| 2015/0183199 A1 | 7/2015 | Kitagawa et al. |
| 2015/0219797 A1 | 8/2015 | Goto et al. |
| 2016/0025910 A1 | 1/2016 | Sawada et al. |
| 2016/0054494 A1 | 2/2016 | Kitagawa et al. |
| 2016/0103258 A1 | 4/2016 | Kitagawa et al. |
| 2016/0195653 A1 | 7/2016 | Lee et al. |
| 2016/0195767 A1 | 7/2016 | Lee et al. |
| 2016/0202403 A1 | 7/2016 | Mathew et al. |
| 2016/0212311 A1 | 7/2016 | Mathew et al. |
| 2016/0299271 A1 | 10/2016 | Lee et al. |
| 2016/0299272 A1 | 10/2016 | Lee et al. |
| 2016/0313480 A1 | 10/2016 | Lee et al. |
| 2016/0377777 A1 | 12/2016 | Lee et al. |
| 2017/0090086 A1 | 3/2017 | Goto et al. |
| 2017/0090087 A1 | 3/2017 | Goto et al. |
| 2017/0129197 A1 | 5/2017 | Yaegashi et al. |
| 2017/0131448 A1 | 5/2017 | Lee et al. |
| 2017/0131449 A1 | 5/2017 | Yaegashi et al. |
| 2017/0131451 A1 | 5/2017 | Yaegashi et al. |

FOREIGN PATENT DOCUMENTS

| | | |
|---|---|---|
| CN | 102609038 A | 7/2012 |
| CN | 105229506 A | 1/2016 |
| CN | 105247395 A | 1/2016 |
| JP | S48-038160 A | 6/1973 |
| JP | S48-064941 A | 9/1973 |
| JP | 58-49901 A | 3/1983 |
| JP | 58-168018 A | 10/1983 |
| JP | 58-168019 A | 10/1983 |
| JP | S58-168020 A | 10/1983 |
| JP | 59-172610 A | 9/1984 |
| JP | 60-133401 A | 7/1985 |
| JP | H07-000770 B2 | 1/1995 |
| JP | H08-506867 A | 7/1996 |
| JP | H09-241594 A | 9/1997 |
| JP | H10-90675 A | 4/1998 |
| JP | H10-183390 A | 7/1998 |
| JP | 11-52130 A | 2/1999 |
| JP | 2001-075048 A | 3/2001 |
| JP | 2003-207608 A | 7/2003 |
| JP | 2004-054031 A | 2/2004 |
| JP | 2005-089782 A | 4/2005 |
| JP | 2005-089783 A | 4/2005 |
| JP | 2005-336249 A | 12/2005 |
| JP | 2006-308923 A | 11/2006 |
| JP | 2006308938 A1 * | 11/2006 |
| JP | 2007-070440 A | 3/2007 |
| JP | 2007-241314 A | 9/2007 |
| JP | 2008-102246 A | 5/2008 |
| JP | 2008-102274 A | 5/2008 |

(56) References Cited

FOREIGN PATENT DOCUMENTS

| | | | |
|---|---|---|---|
| JP | 2009-130317 A | 6/2009 | |
| JP | 2011-81315 A | 4/2011 | |
| JP | 2012-073563 A | 4/2012 | |
| JP | 2012-073574 A | 4/2012 | |
| JP | 2012-98726 A | 5/2012 | |
| JP | 2012-133308 A | 7/2012 | |
| JP | 2012-137738 A | 7/2012 | |
| JP | 2013-065995 A | 4/2013 | |
| JP | 2013-137738 A | 7/2013 | |
| JP | 2013-218319 A | 10/2013 | |
| JP | 2014-081482 A | 5/2014 | |
| JP | 2014081482 A | * 5/2014 | |
| JP | 2014-211548 A | 11/2014 | |
| JP | 2014211548 A | * 11/2014 | |
| JP | 2016-525725 A | 8/2016 | |
| JP | 2016538599 A | 12/2016 | |
| JP | 2017-500606 A | 1/2017 | |
| JP | 2017-503193 A | 1/2017 | |
| KR | 20050070688 A | 7/2005 | |
| KR | 20050085865 A | 8/2005 | |
| KR | 20090132406 A | 12/2009 | |
| KR | 2010-0087837 A | 8/2010 | |
| KR | 10-2010-0125537 A | 12/2010 | |
| KR | 2010-0125558 A | 12/2010 | |
| KR | 2011-0110889 A | 10/2011 | |
| KR | 2012-0046035 A | 5/2012 | |
| KR | 2012-0118205 A | 10/2012 | |
| KR | 2013-0019001 A | 2/2013 | |
| KR | 10-2013-0056323 A | 5/2013 | |
| KR | 101293210 B1 | 8/2013 | |
| KR | 10-2013-0098914 A | 9/2013 | |
| KR | 10-2014-0009035 A | 1/2014 | |
| KR | 10-2015-0058450 A | 5/2015 | |
| KR | 10-2015-0086159 A | 7/2015 | |
| KR | 10-2015-0111871 A | 10/2015 | |
| TW | 200949321 A | 12/2009 | |
| TW | 201602653 A | 1/2016 | |
| WO | 2006/095815 A1 | 9/2006 | |
| WO | 2008/155873 A1 | 12/2008 | |
| WO | 2009/128122 A1 | 10/2009 | |
| WO | 2014/065140 A1 | 5/2014 | |
| WO | 2015/046969 A1 | 4/2015 | |
| WO | 2015/108261 A1 | 7/2015 | |
| WO | 2015/147551 A1 | 10/2015 | |
| WO | 2015/147552 A1 | 10/2015 | |
| WO | 2016/003105 A1 | 1/2016 | |

OTHER PUBLICATIONS

Machine_English_Translation_JP_2014081482_A; Polarizer and Image Display Device; May 8, 2014; JPO; whole document.*

Machine_English_translation_JP_2006308938_A1; Hayakawa, S.; Polyvinyl Alcohol-Based Film, and Polarizing Film, and Polarizing Plate; Nov. 9, 2006; JPO; whole document.*

Explanation of Circumstances Concerning Accelerated Examination filed on Nov. 21, 2017 issued in Japanese patent application No. 2015-190040 with translation.

Explanation of Circumstances Concerning Accelerated Examination filed on Nov. 21, 2017 issued in Japanese patent application No. 2015-190128 with translation (corresponds to U.S. Appl. No. 15/271,973).

Office Action dated Jan. 24, 2018, issued in counterpart Japanese application No. JP2015-190040, with translation.

Explanation of Circumstances Concerning Accelerated Examination filed on Nov. 21, 2017, issued in Japanese application No. 2015-190081 with Translation (corresponding to U.S. Appl. No. 15/271,949).

Non Final Office Action dated Apr. 20, 2018, issued in U.S. Appl. No. 15/271,949.

Office Action dated Jan. 24, 2018, issued in Japanese application No. JP2015-190081, with translation.

Explanation of Circumstances Concerning Accelerated Examination filed on Nov. 21, 2017 issued in Japanese patent application No. 2015-190081 with translation.

Japanese Office Action dated May 30, 2018, issued in Japanese Patent Application No. 2015-190081 with English translation (Corresponds to U.S. Appl. No. 15/271,949).

Non Final Office Action dated Sep. 7, 2017, issued in U.S. Appl. No. 15/271,973.

Non Final Office Action dated Mar. 30, 2018, issued in U.S. Appl. No. 15/271,973.

Non Final Office Action dated Jul. 30, 2018, issued in U.S. Appl. No. 15/271,973.

Office Action dated Jan. 24, 2018, issued in Japanese application No. JP2015-190128, with translation.

Explanation of Circumstances Concerning Accelerated Examination filed on Nov. 21, 2017 issued in Japanese patent application No. 2015-190128 with translation.

Office Action dated Mar. 8, 2017, issued in Japanese Patent Application No. 2015-087685 with English translation corresponds to U.S. Appl. No. 15/306,360.

Non Final Office Action dated Apr. 5, 2018, issued in U.S. Appl. No. 15/306,360.

International Search Report dated Jul. 7, 2015, issued in application PCT/JP2015/062357, with English translation (5 page) corresponds to U.S. Appl. No. 15/306,360.

Office Action dated May 18, 2016, issued in Korean Patent Application 10-2015-7036565, with English translation (12 pages) corresponds to U.S. Appl. No. 15/306,360.

Korean Prior Art search, issued in Korean Patent Application 10-2015-7036565, with English translation (15 pages) corresponds to U.S. Appl. No. 15/306,360.

Office Action dated Jul. 2, 2018, issued in Chinese application No. 201580035132.0, with English translation (corresponds to U.S. Appl. No. 15/321,875).

Office Action dated Jul. 2, 2018, issued in Chinese application No. 201580022128.0, with English translation. (corresponds to U.S. Appl. No. 15/306,390).

Third Party Observation dated Jul. 31, 2018, filed in Japanese application No. 2015-127643 (counterpart of U.S. Appl. No. 15/321,875), with English translation. (33 pages).

Office Action dated Aug. 3, 2018, issued in Chinese application No. 201580022170.2 (Counterpart of U.S. Appl. No. 15/306,316), with English translation. (22 pages).

Office Action dated Aug. 20, 2018, issued in Taiwanese application No. 104113355 (Counterpart of U.S. Appl. No. 15/306,316), with English translation. (23 pages).

Third Party Observation dated Sep. 3, 2018, issued in Japanese application No. 2015-190081(Counterpart of U.S. Appl. No. 15/271,949), with English translation. (24 pages).

Third Observation dated Aug. 28, 2018, issued in counterpart Japanese application No. 2015-190040, with English translation. (25 pages).

Office Action dated Aug. 23, 2018, issued in Taiwanese application No. 104120925 (counterpart to U.S. Appl. No. 15/322,310), with English translation. (49 pages).

Non-Final Office Action dated Nov. 1, 2018, issued in U.S. Appl. No. 15/306,362 (20 pages).

* cited by examiner

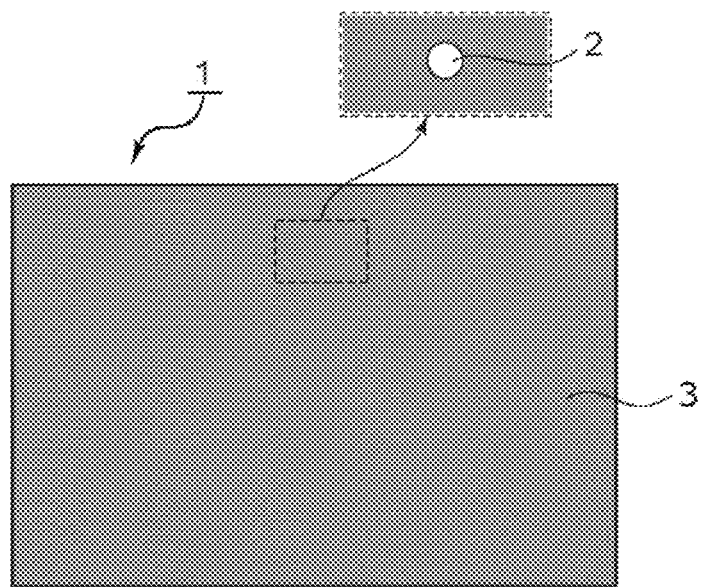

POLARIZER, POLARIZING PLATE, AND IMAGE DISPLAY APPARATUS

This application claims priority under 35 U.S.C. Section 119 to Japanese Patent Application No. 2015-190040 filed on Sep. 28, 2015 which is herein incorporated by reference.

BACKGROUND OF THE INVENTION

1. Field of the Invention

The present invention relates to a polarizer, a polarizing plate, and an image display apparatus.

2. Description of the Related Art

Some of the image display apparatus of a cellular phone, a notebook personal computer (PC), and the like have mounted thereon internal electronic parts, such as a camera. Various investigations have been made for the purpose of improving, for example, the camera performance of any such image display apparatus (for example, Japanese Patent Application Laid-open No. 2011-81315, Japanese Patent Application Laid-open No. 2007-241314, US 2004/0212555, Japanese Patent Application Laid-open No. 2012-137738, and WO 2015/04696 A). However, an additional improvement in camera performance or the like has been desired in association with rapid widespread use of a smart phone and a touch panel-type information processing apparatus. In addition, a polarizer partially having polarization performance has been required in order to correspond to the diversification of the shapes of the image display apparatus and the high-functionalization thereof.

SUMMARY OF THE INVENTION

The present invention has been made to solve the above-mentioned problems, and a primary object of the present invention is to provide a polarizer that can realize the multi-functionalization and high-functionalization of an electronic device, such as an image display apparatus.

A polarizer according to an embodiment of the present invention includes a resin film containing iodine, wherein the polarizer has formed therein a transparent portion having a transmittance higher than that of another portion, and when the polarizer is placed under an environment having a temperature of 60° C. and a humidity of 90% for 2 hours, a transmittance change ($\Delta$Ts) of the transparent portion is 10% or less.

In one embodiment of the present invention, the transparent portion has an iodine content of 1.0 wt % or less.

In one embodiment of the present invention, the transparent portion has a content of at least one of an alkali metal or an alkaline earth metal of 0.5 wt % or less.

In one embodiment of the present invention, the resin film has a thickness of 8 μm or less.

In one embodiment of the present invention, optical characteristics in the another portion satisfy relationships of $P > -(10^{0.929T-42.4}-1) \times 100$, provided that $T < 42.3$, and $P \geq 99.9$, provided that $T \geq 42.3$, where P represents a polarization degree (%) and T represents a single axis transmittance (%).

In one embodiment of the present invention, the resin film contains a polyvinyl alcohol-based resin, and the polyvinyl alcohol-based resin has a saponification degree of 99.0 mol % or more.

In one embodiment of the present invention, the transparent portion corresponds to a camera portion of an image display apparatus on which the polarizer is mounted.

According to another aspect of the present invention, there is provided a method of producing the polarizer as described above. The method includes decolorizing a desired portion of a resin film containing a dichromatic substance.

In one embodiment of the present invention, the decolorizing is performed by bringing a basic solution into contact with the resin film containing the dichromatic substance.

In one embodiment of the present invention, the method farther includes bringing an acidic solution into contact with a portion of the resin film with which the basic solution has been brought into contact.

In one embodiment of the present invention, at a time of the contact of the basic solution, a surface of the resin film is covered with a surface protective film so that at least part of the surface of the resin film may be exposed.

According to still another aspect of the present invention, there is provided a polarizing plate. The polarizing plate includes the above described polarizer having formed therein the transparent portion.

In one embodiment of the present invention, the polarizing plate has a shape corresponding to an image display apparatus on which the polarizing plate is mounted, and the transparent portion is formed to be spaced apart from an end side.

According to still another aspect of the present invention, there is provided an image display apparatus. The image display apparatus the above-described polarizing plate.

According to an embodiment of the present invention, there is provided a polarizer that can achieve the multi-functionalization and high-functionalization of an electronic device.

BRIEF DESCRIPTION OF THE DRAWINGS

FIG. 1 is a plan view of a polarizer according to one embodiment of the present invention.

DETAILED DESCRIPTION OF THE PREFERRED EMBODIMENTS

Embodiments of the present invention are described below. However, the present invention is not limited to these embodiments.

A. Polarizer

FIG. 1 is a plan view of a polarizer according to one embodiment of the present invention. A polarizer 1 includes a resin film containing a dichromatic substance. The polarizer (resin film) 1 has formed therein a transparent portion 2 having a relatively high transmittance. Specifically, the polarizer 1 has formed therein the transparent portion 2 having a transmittance higher than that of another portion 3. The transparent portion can function as a non-polarizing portion. With such construction, a problem in terms of quality, such as cracking, delamination, or adhesive protrusion, is avoided as compared to the case where a through-hole as a non-polarizing portion is formed mechanically (e.g., by a method involving mechanically punching out the through-hole in the polarizer through the use of, for example, chisel punching, a plotter, or a water jet).

In the illustrated example, the transparent portion 2 having a small circular shape is formed in the central portion of the upper end portion of the polarizer 1, but the number, arrangement, shapes, sizes, and the like of the transparent portions can be appropriately designed. The numbers and the like are designed in accordance with, for example, the position, shape, and size of the camera portion of an image display apparatus on which the polarizer is mounted. In this case, the transparent portion preferably has a substantially circular shape having a diameter of 10 mm or less.

The transmittance of the transparent portion (e.g., a transmittance measured with light having a wavelength of 550 nm at 23° C.) is preferably 50% or more, more preferably 60% or more, still more preferably 75% or more, particularly preferably 90% or more. With such transmittance, when the transparent portion is caused to correspond to, for example, the camera portion of an image display apparatus, an adverse effect on the photographing performance of its camera can be prevented.

When the polarizer is placed under an environment having a temperature of 60° C. and a humidity of 90% for 2 hours, the transmittance change ($\Delta Ts$) of the transparent portion is 10% or less, preferably 5% or less, more preferably 1% or less, particularly preferably 0.5% or less. When the polarizer has such transparent portion, an image display apparatus extremely excellent in, for example, photographing performance of a camera can be obtained.

The transparent portion is preferably a portion having a content of the dichromatic substance lower than that of the another portion. The content of the dichromatic substance of the transparent portion is preferably 1.0 wt % or less, more preferably 0.5 wt % or less, still more preferably 0.2 wt % or less. Meanwhile, a lower limit for the content of the dichromatic substance of the transparent portion is typically equal to or less than a detection limit. A difference between the content of the dichromatic substance in the another portion and the content of the dichromatic substance in the transparent portion is preferably 0.5 wt % or more, more preferably 1 wt % or more. When iodine is used as the dichromatic substance, the iodine content of the transparent portion is determined from, for example, a calibration curve produced in advance from an X-ray intensity measured by fluorescent X-ray analysis through the use of a standard sample.

The polarizer (except the transparent portion) preferably exhibits absorption dichroism at any wavelength in the wavelength range of from 380 nm to 780 nm. The polarizer (except the transparent portion) has a single axis transmittance of preferably 40.0% or more, more preferably 41.0% or more, still more preferably 42.0% or more, particularly preferably 43.0% or more. Meanwhile, a theoretical upper limit for the single axis transmittance of the polarizer (except the transparent portion) is 50%, and a practical upper limit therefor is 46%. The polarization degree of the polarizer (except the transparent portion) is preferably 99.8% or more, more preferably 99.9% or more, still more preferably 99.95% or more.

The thickness of the polarizer (resin film) is, for example, 10 μm or less, preferably 8 μm or less, more preferably 5 μm or less. The adoption of such thickness can result in the formation of a transparent portion excellent in surface smoothness. In addition, in contact with a basic solution to be described later, the transparent portion is formed in a short time period. Further, the thickness of a portion with which the basic solution is brought into contact may be thinner than the other portion, but when the thickness of the polarizer is small, a difference in thickness between the portion brought into contact with the basic solution and the other portion can be reduced. Meanwhile, the thickness of the polarizer is preferably 1.0 μm or more, more preferably 2.0 μm or more.

In one embodiment, the polarization degree (P) and the single axis transmittance (T) satisfy relationships of $P>-(10^{0.929T-42.4}-1)\times 100$ (provided that T<42.3) and P≥99.9 provided that T≥42.3), and the thickness of the polarizer is 8 μm or less. Such relationships can fee satisfactorily achieved by a production method to be described later.

Examples of the dichromatic substance include iodine and an organic dye. The substances may be used alone or in combination. Of those, iodine is preferably used. The use of iodine can result in satisfactory formation of the transparent portion.

Any appropriate resin may be used as a resin for forming the resin film. A polyvinyl alcohol-based resin (hereinafter referred to as "PVA-based resin") is preferably used as the resin. Examples of the PVA-based resin include polyvinyl alcohol and an ethylene-vinyl alcohol copolymer. The polyvinyl alcohol is obtained by saponifying polyvinyl acetate. The ethylene-vinyl alcohol copolymer is obtained by saponifying an ethylene-vinyl acetate copolymer. The saponification degree of the PVA-based resin is typically from 85 mol % to 100 mol %, preferably 95.0 mol % or more, more preferably 99.0 mol % or more, particularly preferably 99.9 mol % or more. The saponification degree may be determined in conformity with JIS K 6726-1994. The use of the PVA-based resin having such saponification degree can provide a polarizer excellent in durability.

The average polymerization degree of the PVA-based resin may be appropriately selected depending on purposes. The average polymerization degree is typically from 1,000 to 10,000, preferably from 1,200 to 6,000, more preferably from 2,000 to 5,000. The average polymerization degree may be determined in conformity with JIS K 6726-1994.

B. Method of Producing Polarizer

A method involving decolorizing a desired portion of a resin film containing a dichromatic substance is preferably adopted as a method of producing the polarizer. According to such method, a polarizer that can satisfy the optical characteristics (the single axis transmittance and the polarization degree) can be satisfactorily obtained. In addition, such method has an extremely high degree of freedom in design in terms of, for example, the site at which the transparent portion is formed, and the size and shape of the transparent portion. A method involving arranging an anti-dyeing layer on the resin film so that the desired portion may not be dyed, and then dyeing the resultant with the dichromatic substance can also be adopted. However, in such method, for example, in order that the peeling of the anti-dyeing layer may be prevented or the shape of the transparent portion to be formed may be precisely controlled, it is important that a stretching treatment be completed before the dyeing of the resin film. As a result, the optical characteristics of a portion except the transparent portion may not be sufficiently obtained. In such method, from the viewpoint of securing dyeability, the saponification degree of a PVA-based resin in the resin film is preferably less than 99.0 mol %. A polarizer is industrially produced by subjecting a resin film having an elongated shape to various treatments, such as dyeing, but it is practically difficult to arrange the anti-dyeing layer at a position spaced apart from an end side of the resin film to form the transparent portion (e.g., to form a circular transparent portion at the center of the film). Specifically, the anti-dyeing layer is preferably removed after the dyeing, and a pressure-sensitive adhesive film having an elongated shape is industrially used as the anti-dyeing layer. However, it is difficult, to arrange the pressure-sensitive adhesive film having an elongated shape so that the film may be spaced apart from the end side of the resin film.

B-1. Resin Film Containing Dichromatic Substance

The resin film containing the dichromatic substance can be typically obtained by subjecting a resin film (a resin layer formed on a substrate is also permitted) to any one of various treatments, such as a dyeing treatment, a stretching treatment, a swelling treatment, a cross-linking treatment, a washing treatment, and a drying treatment. The number of times, order, timing, and the like of the treatments may be appropriately set.

The thickness of the substrate is preferably from 20 μm to 300 μm, more preferably from 50 μm to 200 μm. As the materials for forming the substrate, there are given, for example, an ester-based resin, such as a polyethylene terephthalate-based resin, a cycloolefin-based resin, an olefin-based resin, such as polypropylene, a (meth)acrylic resin, a polyamide-based resin, a polycarbonate-based resin, and a copolymer resin thereof. Of those, a polyethylene terephthalate-based resin is preferably used. In particular, an amorphous polyethylene terephthalate-based resin is preferably used. Specific examples of the amorphous polyethylene terephthalate-based resin include: a copolymer further containing isophthalic acid as a dicarboxylic acid component; and a copolymer further containing cyclohexanedimethanol as a glycol component. The substrate, as it is, can be utilized as a protective film.

The thickness of the resin layer is preferably from 3 μm to 40 μm, more preferably from 3 μm to 20 μm, still more preferably from 3 μm to 15 μm. The resin layer is, for example, an applied layer formed by applying an application liquid containing the PVA-based resin onto the substrate, and drying the liquid. The application liquid is typically a solution prepared by dissolving the PVA-based resin in a solvent. Water is preferably used as the solvent. The PVA-based resin concentration of the solution is preferably from 3 parts by weight to 20 parts by weight with respect to 100 parts by weight of the solvent. The saponification degree of the PVA-based resin in the application liquid is preferably 99.5 mol % or less. This is because film formability on the substrate can be sufficiently secured.

In one embodiment, the resin film containing the dichromatic substance is produced by a method involving: dyeing the resin film with a dyeing liquid containing iodine; and subjecting the resin film (laminate of the substrate and the resin layer) to underwater stretching after the dyeing. When the underwater stretching is performed after the dyeing, the film can be more excellent in stretchability. As a result, a polarizer excellent in optical characteristics can be obtained.

The dyeing liquid is preferably an aqueous solution of iodine. The compounding amount of iodine is preferably from 0.1 part by weight to 0.5 part by weight with respect to 100 parts by weight of water. The aqueous solution of iodine is preferably compounded, with an iodide (e.g., potassium iodide) in order that the solubility of iodine in water may be increased. The compounding amount of the iodide is preferably from 0.1 part by weight to 20 parts by weight, more preferably from 0.5 part by weight to 10 parts by weight with respect to 100 parts by weight of water.

The resin film is typically dyed by being immersed in the dyeing liquid. The liquid temperature of the dyeing liquid is preferably from 20° C. to 50° C. An immersion time is preferably from 5 seconds to 5 minutes. The dyeing conditions (the concentration, the liquid temperature, and the immersion time) may be set so that the polarization degree or single axis transmittance of the polarizer to be finally obtained may fall within a predetermined range.

The underwater stretching is preferably performed by immersing the resin film (laminate of the substrate and the resin layer) in an aqueous solution of boric acid. The aqueous solution of boric acid is preferably obtained by dissolving boric acid and/or a borate in water serving as a solvent. The concentration of boric acid is preferably from 1 part by weight to 10 parts by weight with respect to 100 parts by weight of water. When the concentration of boric acid is set to 1 part by weight or more, the dissolution of the resin layer can be effectively suppressed.

The aqueous solution of boric acid is preferably compounded with an iodide. This is because the elution of iodine can be suppressed when the resin film is dyed in advance. The concentration of the iodide is preferably from 0.05 part by weight to 15 parts by weight, more preferably from 0.5 part by weight to 8 parts by weight with respect to 100 parts by weight of water.

The liquid temperature of the aqueous solution of boric acid at the time of the stretching is preferably from 40° C. to 85° C., more preferably from 50° C. to 85° C. The time period for which the resin film (laminate) is immersed in the aqueous solution of boric acid is preferably from 15 seconds to 5 minutes. The stretching ratio of the resin film (laminate) by the underwater stretching is preferably 2.0 times or more. Any appropriate method may be adopted as a method for the stretching. The stretching may be performed in one stage, or may be performed in a plurality of stages. In addition, the underwater stretching may be combined with in-air stretching. A mode involving performing the underwater stretching after the in-air stretching is preferably adopted. The resin film (laminate) is stretched at a stretching ratio of preferably 4.0 times or more, more preferably 5.0 times or more with respect to its original length.

B-2. Decolorization

A method involving bringing the basic solution into contact with the resin film containing the dichromatic substance is preferably, adopted as a method for the decolonization. When iodine is used as the dichromatic substance, the contact of the basic solution with a desired portion of the resin film can easily reduce the iodine content of the contact portion. Specifically, the contact can cause the basic solution to permeate into the resin film. An iodine complex in the resin film is reduced by a base in the basic solution to become an iodine ion. The reduction of the iodine complex to the iodine ion can increase the transmittance of the contact portion. Then, iodine that has become the iodine ion moves from the resin film into the basic solution. The transparency of the transparent portion thus obtained can be satisfactorily maintained. Specifically, for example, when the decolonization is performed by breaking the iodine complex through irradiation with laser light, iodine remaining in the resin film may form the iodine complex again in association with the use of the polarizer to degrade the transmittance, but when the iodine content is reduced, such problem is prevented.

Any appropriate method may be adopted as a method of bringing the basic solution into contact with the resin film. Examples thereof include: a method involving dropping, applying, or spraying the basic solution onto the resin film; and a method involving immersing the resin film in the basic solution. Upon contact of the basic solution, the resin film may be protected with any appropriate means (such as a protective film or a surface protective film) so that the basic solution may be prevented from being brought into contact with a portion except the desired portion (so that the concentration of the dichromatic substance may not reduce).

Any appropriate basic compound may be used as a basic compound in the basic solution. Examples of the basic compound include: hydroxides of alkali metals, such as sodium hydroxide, potassium hydroxide, and lithium hydroxide; hydroxides of alkaline earth metals, such as calcium hydroxide; inorganic alkali metal salts, such as sodium carbonate; organic alkali metal salts, such as sodium, acetate; and ammonia water. Of those, hydroxides of alkali metals and/or alkaline earth metals are preferred, sodium hydroxide, potassium hydroxide, and lithium hydroxide are more preferred, and sodium hydroxide is particularly preferred. This is because the iodine complex can be efficiently ionized, and hence the transparent portion can be formed with additional ease. Those basic compounds may be used alone or in combination.

Any appropriate solvent may be used as the solvent of the basic solution. Specific examples thereof include: water; alcohols, such as ethanol and methanol; ethers; benzene; chloroform; and a mixed solvent thereof. Of those, water or an alcohol is preferably used because the iodine ion can satisfactorily migrate to the solvent.

The concentration of the basic solution is, for example, from 0.01 N to 5 N, preferably from 0.05 N to 3 N, more preferably from 0.1 N to 2.5 N. When the concentration of the basic solution falls within such range, the transparent portion can be efficiently formed. When the basic solution is an aqueous solution of sodium hydroxide, the concentration is preferably 1.0 wt % or more, more preferably from 2 wt % to 8 wt %.

The liquid temperature of the basic solution is, for example, 20° C. or more, preferably from 25° C. to 50° C. When the basic solution is brought into contact with the resin film at such temperature, the transparent portion can be efficiently formed.

The time period for which the basic solution is brought into contact with the resin film is set in accordance with, for example, the thickness of the resin film, and the kind and concentration of the basic compound in the basic solution. The contact time is, for example, from 5 seconds to 30 minutes, preferably from 5 seconds to 5 minutes.

As described above, upon contact of the basic solution, the resin film may be protected so that the basic solution may be prevented from being brought into contact with a portion except the desired portion. The protective film, as it is, can be utilized as a protective film for the polarizer. The surface protective film is temporarily used at the time of the production of the polarizer. The surface protective film is typically bonded to the resin film through intermediation of a pressure-sensitive adhesive layer because the surface protective film is removed from the polarizer at any appropriate timing.

In one embodiment, at the time of the contact of the basic solution, the surface of the resin film is covered with a surface protective film so that at least part of the surface of the resin film may be exposed. The polarizer of the illustrated example is produced by, for example, bonding a surface protective film having formed therein a through-hole having a small circular shape to the resin film containing the dichromatic substance, and bringing the basic solution into contact with the resultant. At that time, the other side of the resin film (the side on which the surface protective film is not arranged) is also preferably protected.

B-3. Others

In one embodiment, the basic solution is removed from the resin film by any appropriate means after its contact with the resin film. According to such embodiment, for example, a reduction in transmittance of the transparent portion in association with the use of the polarizer can be prevented with additional reliability. A method of removing the basic solution is specifically, for example, washing, removal by wiping with waste cloth or the like, suction removal, natural drying, heat drying, blow drying, or drying under reduced pressure. The basic solution is preferably washed off. A washing liquid to be used in the washing is, for example, water (pure water), an alcohol, such as methanol or ethanol, or a mixed solvent thereof. Of those, water is preferably used. The number of times of the washing is not particularly limited, and the washing may be performed a plurality of times. When the basic solution is removed by drying, the temperature at which the solution is dried is, for example, from 20° C. to 100° C.

It is preferred that after the contact with the basic solution, the content of an alkali metal and/or an alkaline earth metal in the resin film be reduced in a contact portion with which the basic solution has been brought into contact. The reduction in content of the alkali metal and/or the alkaline earth metal can provide a transparent portion excellent in dimensional stability. Specifically, the shape of the transparent portion formed by the contact with the basic solution can be maintained as it is even under a humidified environment.

When the basic solution is brought into contact with the resin film, a hydroxide of the alkali metal and/or the alkaline earth metal may remain in the contact portion. In addition, when the basic solution is brought into contact with the resin film, a metal salt (e.g., a borate) of the alkali metal and/or the alkaline earth metal may be produced in the contact portion. Any such hydroxide or metal salt may produce a hydroxide ion, and the produced hydroxide ion may act on (decompose or reduce) the dichromatic substance (e.g., an iodine complex) present around the contact portion to expand a non-polarization region (transparent region). Therefore, it is assumed that the reduction in content of the alkali metal salt and/or the alkaline earth metal salt suppresses temporal expansion of the non-polarization region and hence enables the maintenance of a desired shape of the non-polarization portion.

The content of the alkali metal and/or the alkaline earth metal in the transparent portion is preferably 3.6 wt % or less, more preferably 2.5 wt % or less, still more preferably 1.0 wt % or less, particularly preferably 0.5 wt % or less. The content of the alkali metal and/or the alkaline earth metal can be determined from, for example, a calibration curve produced in advance from an X-ray intensity measured by fluorescent X-ray analysis through the use of a standard sample.

A method involving bringing an acidic solution into contact with the contact portion with the basic solution is preferably used as a method for the reduction. According to such method, the alkali metal and/or the alkaline earth metal is efficiently caused to migrate toward the acidic solution, and hence the content thereof can be reduced. The contact with the acidic solution may be performed after the removal of the basic solution, or may be performed without the removal of the basic solution.

Any appropriate acidic compound may be used as an acidic compound in the acidic solution. Examples of the acidic compound include: inorganic acids, such as hydrochloric acid, sulfuric acid, nitric acid, and hydrogen fluoride; and organic acids, such as formic acid, oxalic acid, citric acid, acetic acid, and benzoic acid. Of those, an inorganic acid is preferred as the acidic compound in the acidic solution, and hydrochloric acid, sulfuric acid, or nitric acid is more preferred. Those acidic compounds may be used alone or in combination.

Any one of the solvents listed as the examples of the solvent of the basic solution may be used as the solvent of the acidic solution. The concentration of the acidic solution is, for example, from 0.01 N to 5 N, preferably from 0.05 N to 3 N, more preferably from 0.1 N to 2.5 N.

The liquid temperature of the acidic solution is, for example, from 20° C. to 50° C. The time period for which the acidic solution is brought into contact with the portion is, for example, from 5 seconds to 5 minutes. The same method as the method of bringing the basic solution into contact with the resin film can be adopted as a method of bringing the acidic solution into contact with the portion. In addition, the acidic solution can be removed from the resin film. The same method as the method of removing the basic solution can be adopted as a method of removing the acidic solution.

C. Polarizing Plate

A polarizing plate of the present invention includes the above-described polarizer. The polarizing plate typically includes the polarizer and a protective film arranged on at least one side of the polarizer. As the materials for forming the protective film, there are given, for example, a cellulose-based resin, such as diacetyl cellulose or triacetyl cellulose, a (meth)acrylic resin, a cycloolefin-based resin, an olefin-based resin, such as polypropylene, an ester-based, resin, such as a polyethylene terephthalate-based resin, a polyamide-based resin, a polycarbonate-based resin, and copolymer resins thereof.

The surface of the protective film on which the polarizer is not laminated may have formed thereon a hard coat layer, or may be subjected to an antireflection treatment or a treatment intended for diffusion or for glare prevention. Such layer or treated surface may serve as a surface-treated layer. The surface-treated layer is preferably, for example, a layer having a low moisture permeability for the purpose of improving the humidification durability of the polarizer. A hard coat treatment is performed for the purpose of, for example, preventing the surface of the polarizing plate from being flawed. The hard coat layer can be formed by, for example, a system involving adding, to the surface, a cured coating film based on an appropriate UV-curable resin, such as an acrylic UV-curable resin or a silicone-based UV-curable resin, the cured coating film being excellent in hardness, sliding characteristic, and the like. The hard coat layer preferably has a pencil hardness of 2 H or more. The antireflection treatment is performed for the purpose of preventing the reflection of ambient light on the surface of the polarizing plate, and can be achieved by the formation of a low-reflection layer of a type in conformity with a conventional one, such as a thin-layer type disclosed in Japanese Patent Application Laid-open No. 2005-248173 that prevents the reflection through the utilization of a reflected light-canceling effect exhibited by an optical interferential action or a structure type disclosed in Japanese Patent Application Laid-open No. 2011-2759 that provides the surface with a fine structure to express a low reflectance. An antiglare treatment is performed for the purpose of, for example, preventing the inhibition of the viewing of light transmitted through the polarizing plate due to the reflection of the ambient light on the surface of the polarizing plate, and is performed by, for example, providing the surface of the protective film with a fine uneven structure according to an appropriate system, such as a surface-roughening system based on a sandblast system or an embossing system, or a system involving compounding transparent fine particles. An antiglare layer may also serve as a diffusion layer (e.g., a viewing angle-broadening function) for diffusing the light transmitted through the polarizing plate to broaden a viewing angle or the like.

The thickness of the protective film is preferably from 10 μm to 100 μm. The protective film is typically laminated on the polarizer through inter-mediation of an adhesion layer (specifically an adhesive layer or a pressure-sensitive adhesive layer). The adhesive layer is typically formed of a PVA-based adhesive or an active energy ray-curable adhesive. The pressure-sensitive adhesive layer is typically formed of an acrylic pressure-sensitive adhesive.

D. Image Display Apparatus

An image display apparatus of the present invention includes the above-described polarizing plate. Examples of the image display apparatus include a liquid crystal display apparatus and an organic EL device. Specifically, the liquid crystal display apparatus includes a liquid crystal panel including: a liquid crystal cell; and the polarizing plate arranged on one side, or each of both sides, of the liquid crystal cell. The organic EL device includes an organic EL panel including the polarizing plate arranged on a viewer side. The polarizing plate is typically arranged so that the transparent portion of the polarizer may correspond to the camera portion of an image display apparatus on which the polarizing plate is mounted.

Now, the present invention is specifically described by way of Examples. However, the present invention is not limited to these Examples. Methods of measuring respective characteristics are as described below.

1. Thickness

Measurement was performed with a digital micrometer (manufactured by Anritsu Corporation, product name: "KC-351C").

2. Optical Characteristics

The single axis transmittance (Ts), parallel transmittance (Tp), and cross transmittance (Tc) of a polarizer were measured with a UV-visible spectrophotometer (manufactured by JASCO Corporation, product name: "V-7100"), and its polarization degree (P) was determined from the equation as indicated below. The Ts, the Tp, and the Tc are Y values measured with the two-degree field of view (C light source) of JIS Z 8701 and subjected to visibility correction.

$$\text{Polarization degree } (P) \text{ (\%)} = \{(Tp-Tc)/(Tp+Tc)\}^{1/2} \times 100$$

EXAMPLE 1

Production of Laminate

An amorphous isophthalic acid-copolymerized polyethylene terephthalate (IPA-copolymerized PET) film having an elongated shape and having a coefficient of water absorption of 0.75% and at Tg of 75° C. (thickness: 100 μm) was used as a resin substrate.

One surface of the resin substrate was subjected to a corona treatment. An aqueous solution containing polyvinyl alcohol (polymerization degree: 4,200, saponification degree: 99.2 mol %) and acetoacetyl-modified PVA (polymerization degree: 1,200, acetoacetyl modification degree: 4.6%, saponification degree: 99.0 mol % or more, manufactured by The Nippon Synthetic Chemical Industry Co., Ltd., trade name: "GOHSEFIMER Z-200") at a ratio of 9:1 was applied to the corona-treated surface at 25° C. and dried to form a PVA-based resin layer having a thickness of 11 μm. Thus, a laminate was produced.

Production of Polarizing Plate

The resultant laminate was subjected to free-end uniaxial stretching at a stretching ratio of 2.0 times in its longitudinal direction (lengthwise direction) between rolls having different peripheral speeds in an oven at 140° C. (in-air auxiliary stretching).

Next, the laminate was immersed in an insolubilizing bath having a liquid temperature of 30° C. (aqueous solution of boric acid obtained try compounding 100 parts by weight of water with 4 parts by weight of boric acid) for 30 seconds (insolubilizing treatment).

Next, the laminate was immersed in a dyeing bath having a liquid temperature of 30° C. (dyeing treatment). In the dyeing treatment, an iodine concentration and an immersion time can be appropriately adjusted so that a polarizing plate to be obtained may have a predetermined transmittance, and in this example, the laminate was immersed in an aqueous solution of iodine obtained by compounding 100 parts by weight of water with 0.3 part by weight of iodine and 2.0 parts by weight of potassium iodide for 60 seconds.

Next, the laminate was immersed in a cross-linking bath having a liquid temperature of 30° C. (aqueous solution of boric acid obtained by compounding 100 parts by weight of water with 3 parts by weight of potassium iodide and 3 parts by weight of boric acid) for 30 seconds (cross-linking treatment).

After that, the laminate was subjected to uniaxial stretching so as to achieve a total stretching ratio of 5.5 times in the longitudinal direction (lengthwise direction) between rolls having different peripheral speeds while being immersed in an aqueous solution of boric acid having a liquid temperature of 70° C. (aqueous solution obtained by compounding 100 parts by weight of water with 3 parts by weight of boric acid and 5 parts by weight of potassium iodide) (underwater stretching).

After that, the laminate was immersed in a washing bath having a liquid temperature of 30° C. (aqueous solution obtained by compounding 100 parts by weight of water with 4 parts by weight of potassium iodide) (washing treatment).

After the washing, an aqueous solution of a PVA-based resin (manufactured by The Nippon Synthetic Chemical Industry Co., Ltd., trade name: "GOHSEFIMER (trademark) Z-200", resin concentration: 3 wt %) was applied onto a PVA-based resin layer surface of the laminate, a triacetyl cellulose film (manufactured by Konica Minolta, Inc., trade name: "KC4UY", thickness: 40 μm) was bonded thereto, and the resultant was heated in an oven maintained at 60° C. for 5 minutes. Thus, a polarizing plate including a polarizer having a thickness of 5 μm (single axis transmittance: 41.0%, polarization degree: 99.998%) was produced.

Formation of Transparent Portion

The resin substrate was peeled from the resultant polarizing plate, a surface protective film having formed therein a circular through-hole having a diameter of 20 mm was bonded to the peeled surface (polarizer surface), and the resultant was immersed in a 1 mol/L (1 N, 4 wt %) aqueous solution of sodium hydroxide for 10 seconds (alkali treatment). After that, the resultant was dried at 60° C. and the surface protective film was peeled. Thus, a polarizing plate having a transparent portion was obtained. A PET film (thickness: 38 μm, manufactured by Mitsubishi Plastics, Inc., trade name: DIAFOIL) having formed thereon a pressure-sensitive adhesive layer having a thickness of 5 μm was used as the surface protective film.

EXAMPLE 2

A polarizing plate having a transparent portion was obtained in the same manner as in Example 1 except that immersion in 0.1 H hydrochloric acid for 30 seconds (acid treatment) was performed after the alkali treatment.

EXAMPLE 3

Production of Polarizing Plate

A PVA film having a thickness of 60 μm (manufactured by Kuraray Co., Ltd., VF-PE #6000) was stretched at a stretching ratio of 2.0 times while being immersed in an aqueous solution at 30° C. for 30 seconds (swelling treatment).

Next, the PVA film was stretched at a stretching ratio of up to 3.0 times while being immersed in a dyeing bath having a liquid temperature of 30° C. (dyeing treatment). In the dyeing treatment, an iodine concentration and an immersion time can be appropriately adjusted so that a polarizing plate to be obtained may have a predetermined transmittance, and in this example, the film was dyed by being immersed in an aqueous solution of iodine obtained by compounding 100 parts by weight of water with 0.05 part by weight of iodine and 0.3 part by weight of potassium iodide for 60 seconds.

Next, the PVA film was immersed in a cross-linking bath having a liquid temperature of 30° C. (aqueous solution of boric acid obtained by compounding 100 parts by weight of water with 3 parts by weight of potassium iodide and 3 parts by weight of boric acid) for 30 seconds (cross-linking treatment).

After that, the PVA film was uniaxially stretched in its longitudinal direction (lengthwise direction) between rolls having different peripheral speeds so that a total stretching ratio became 5.5 times while being immersed in an aqueous solution of boric acid having a liquid temperature of 60° C. (aqueous solution obtained by compounding 100 parts by weight of water with 4 parts by weight of boric acid and 5 parts by weight of potassium iodide) (underwater stretching).

After that, the PVA film was immersed in a washing bath having a liquid temperature of 30° C. (aqueous solution obtained by compounding 100 parts by weight of water with 4 parts by weight of potassium iodide) (washing treatment).

After the washing, an aqueous, solution of a PVA-based resin (manufactured by The Nippon Synthetic Chemical Industry Co., Ltd., trade name: "GOHSEFIMER trademark) Z-200", resin concentration: 3 wt %) was applied-to-one surface of the PVA film, a triacetylcellulose film (manufactured by Konica Minolta, Inc., trade name: "KC4UY", thickness: 40 μm) was bonded thereto, and the resultant was heated in an oven maintained at 60° C. for 5 minutes. Thus, a polarizing plate including a polarizer having a thickness of 23 μm (single axis transmittance: 42.0%, polarization degree: 99.998%) was produced.

Formation of Transparent Portion

The above-described surface protective film was bonded to the polarizer surface of the resultant polarizing plate, and the resultant was immersed in a 1 mol/L (1 N) aqueous solution of sodium hydroxide for 30 seconds. Next, the resultant was immersed in 0.1 N hydrochloric acid for 30 seconds. After that, the resultant was dried at 60° C. and the surface protective film was peeled. Thus, a polarizing plate having a transparent portion was obtained.

COMPARATIVE EXAMPLE 1

A resin substrate was peeled from a polarizing plate obtained in the same manner as in Example 1, and a surface protective film having a total thickness of 129 µm was bonded to the peeled surface (polarizer surface). The resultant was irradiated with laser light (wavelength: 532 nm) from the surface protective film side by using a solid laser (YAG). Conditions for the irradiation with the laser light were as follows: a pulse energy of 40 µJ, a scanning speed of 100 mm/sec, and a pulse repetition rate of 3,120 Hz. Thus, a circular transparent portion having a diameter of 20 mm was formed in the polarizing plate.

COMPARATIVE EXAMPLE 2

Production of Laminate

A laminate was produced in the same manner as in Example 1.

Production of Polarizing Plate

The resultant laminate was stretched at a stretching ratio of up to 5.0 times by free-end uniaxial stretching under heating at 110° C. The thickness of the PVA-based resin layer after the stretching treatment was 5 µm (in-air stretching).

Next, the laminate was immersed in a dyeing bath having a liquid temperature of 30° C. (an aqueous solution of iodine obtained by compounding 100 parts by weight of water with 0.2 part by weight of iodine and 1.5 parts by weight of potassium iodide) for 60 seconds (dyeing treatment).

Next, the laminate was immersed in a cross-linking bath having a liquid temperature of 60° C. (an aqueous solution of boric acid obtained by compounding 100 parts by weight of water with 5 parts by weight of potassium iodide and 5 parts by weight of boric acid) for 60 seconds (cross-linking treatment).

After that, the laminate was immersed in a washing bath (an aqueous solution obtained by compounding 100 parts by weight of water with 3 parts by weight of potassium iodide) (washing treatment).

After the washing, a PVA-based resin aqueous solution (manufactured by The Nippon Synthetic Chemical Industry Co., Ltd., trade name: "GOHSEFIMER (trademark) Z-200", resin concentration: 3 wt %) was applied to the PVA-based resin layer surface of the laminate, and a triacetylcellulose film (manufactured by Konica Minolta, Inc., trade name: "KC4UY", thickness: 40 µm) was bonded thereto, followed by the heating of the resultant in an oven maintained at 60° C. for 5 minutes. Thus, a polarizing plate including a polarizer having a thickness of 4 µm (single axis transmittance: 42.0%, polarization degree: 99.8%) was produced.

Formation of Transparent Portion

A transparent portion was formed in the resultant polarizing plate in the same manner as in Comparative Example 1. Thus, a polarizing plate having the transparent portion was obtained.

COMPARATIVE EXAMPLE 3

A polarizing plate having a transparent portion was obtained in the same manner as in Comparative Example 1 except that a polarizing plate obtained in the same manner as in Example 3 was used.

The resultant polarizing plates were each subjected to the following evaluations. The evaluation results are shown in Table 1.

1. Iodine Content of Polarizer

The iodine content of a polarizer before the formation of a transparent portion and the iodine content of the transparent portion were measured. Specifically, the content of each element was determined from a calibration curve created in advance from the X-ray intensity of the element measured by fluorescent X-ray analysis under the following conditions through the use of a standard sample.
Analysis apparatus: manufactured by Rigaku Corporation, X-ray fluorescence (XRF) analysis apparatus, product name "ZSX100e"
Anticathode: rhodium
Dispersive crystal: lithium fluoride
Excitation light energy: 40 kV-90 mA
Iodine measured line: I-LA
Quantification method: FP method
2θ angle peak: 103.078 deg (iodine)
Measurement time: 40 seconds 2. Transmittance The transmittance (Ts1) of a transparent portion was measured with a spectrophotometer (manufactured by Murakami Color Research Laboratory, product name: "Dot-3"). In addition, each of the resultant polarizing plates was bonded to a glass plate with a pressure-sensitive adhesive so that its polarizer surface was on the glass plate side, and the resultant was placed under an environment having a temperature of 60° C. and a humidity of 90% for 2 hours. After that, the transmittance (Ts2) of the transparent portion was also measured, and the transmittance change (ΔTs) of the transparent portion after the placement under the humidified environment relative to the transmittance before the placement was determined. Specifically, the ΔTs is calculated from (Ts1)–(Ts2).

TABLE 1

| | Formation of transparent portion | Dyeing | Transparent portion | | | Transmittance (%) | |
| --- | --- | --- | --- | --- | --- | --- | --- |
| | | | Thickness (µm) | Iodine (wt %) | | Ts1 | ΔTs |
| | | | | Before decolorization | After decolorization | | |
| Example 1 | Alkali treatment | Before stretching | 5 | 8 | <0.1 | 91 | <0.1 |
| Example 2 | Alkali treatment | Before stretching | 5 | 8 | <0.1 | 91 | <0.1 |

TABLE 1-continued

| | Formation of transparent portion | Dyeing | Thickness (μm) | Transparent portion | | Transmittance (%) | |
| --- | --- | --- | --- | --- | --- | --- | --- |
| | | | | Iodine (wt %) | | | |
| | | | | Before decolorization | After decolorization | Ts1 | ΔTs |
| Example 3 | Alkali treatment | Before stretching | 23 | 4 | <0.1 | 91 | <0.1 |
| Comparative Example 1 | Laser light irradiation | Before stretching | 5 | 8 | 8 | 88 | 40 |
| Comparative Example 2 | Laser light irradiation | After stretching | 4 | 9 | 9 | 85 | 35 |
| Comparative Example 3 | Laser light irradiation | Before stretching | 23 | 4 | 4 | 80 | 35 |

In each of Examples, the humidification reliability of the transparent portion is excellent. In contrast, in each of Comparative Examples, the humidification reliability of the transparent portion is low.

Examples 1 and 2 were each also evaluated for the following item.

Sodium Content

A sodium content in the transparent portion of a polarizer was determined by fluorescent X-ray analysis. Specifically, the sodium content of the polarizer was determined from a calibration curve produced in advance from an X-ray intensity measured under the following conditions through the use of a standard sample.
   Analysis apparatus: manufactured by Rigaku Corporation, X-ray fluorescence (XRF) analysis apparatus, product name "ZSX100e"
   Anticathode: rhodium
   Dispersive crystal: lithium fluoride
   Excitation light energy: 40 kV-90 mA
   Sodium measured line: Na-KA
   Quantification method: FP method
   Measurement time: 40 seconds While the sodium content of the transparent portion of Example 1 was 4.0 wt %, the sodium content of the transparent portion of Example 2 was 0.04 wt %.

The polarizer of the present invention is suitably used in an image display apparatus (a liquid crystal display apparatus or an organic EL device) with a camera of, for example, a cellular phone, such as a smart phone, a notebook PC, or a tablet PC.

Many other modifications will be apparent to and be readily practiced by those skilled in the art without departing from the scope and spirit of the invention. It should therefore be understood that the scope of the appended claims is not intended to be limited by the details of the description but should rather be broadly construed.

What is claimed is:

1. A polarizer, comprising a resin film containing iodine, wherein the polarizer has formed therein a transparent portion having a transmittance higher than that of another portion, and when the polarizer is placed under an environment having a temperature of 60° C. and a humidity of 90% for 2 hours, a transmittance change (ΔTs) of the transparent portion is 10% or less.

2. The polarizer according to claim 1, wherein the transparent portion has an iodine content of 1.0 wt % or less.

3. The polarizer according to claim 1, wherein the transparent portion has a content of at least one of an alkali metal or an alkaline earth metal of 0.5 wt % or less.

4. The polarizer according to claim 1, wherein the resin film contains a polyvinyl alcohol-based resin, and the polyvinyl alcohol-based resin has a saponification degree of 99.0 mol % or more.

5. The polarizer according to claim 1, wherein the transparent portion corresponds to a camera portion of an image display apparatus on which the polarizer is mounted.

6. The polarizer according to claim 1, wherein the resin film has a thickness of 8 μm or less.

7. The polarizer according to claim 6, wherein optical characteristics in the another portion satisfy relationships of $P > -(10^{0.929T-42.4}-1) \times 100$, provided that $T<42.3$, and $P \geq 99.9$, provided that $T \geq 42.3$, where P represents a polarization degree (%) and T represents a single axis transmittance (%).

8. A polarizing plate, comprising the polarizer having formed therein the transparent portion of claim 1.

9. The polarizing plate according to claim 8, wherein the polarizing plate has a shape corresponding to an image display apparatus on which the polarizing plate is mounted, and the transparent portion is formed to be spaced apart from an end side.

10. An image display apparatus, comprising the polarizing plate of claim 8.

11. A method of producing the polarizer of claim 1, the method comprising decolorizing a desired portion of a resin film containing a dichromatic substance.

12. The production method according to claim 11, wherein the decolorizing is performed by bringing a basic solution into contact with the resin film containing the dichromatic substance.

13. The production method according to claim 12, further comprising bringing an acidic solution into contact with a portion of the resin film with which the basic solution has been brought into contact.

14. The production method according to claim 12, wherein at a time of the contact of the basic solution, a surface of the resin film is covered with a surface protective film so that at least part of the surface of the resin film may be exposed.

* * * * *